(12) United States Patent
Huang et al.

(10) Patent No.: US 10,394,907 B2
(45) Date of Patent: Aug. 27, 2019

(54) FILTERING DATA OBJECTS

(71) Applicant: Alibaba Group Holding Limited, Grand Cayman (KY)

(72) Inventors: Yicong Huang, Hangzhou (CN); Junliang Li, Hangzhou (CN); Dengbo Fu, Hangzhou (CN); Qi Qiang, Hangzhou (CN); Chao Wang, Hangzhou (CN); Yunfeng Gan, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 528 days.

(21) Appl. No.: 14/991,797

(22) Filed: Jan. 8, 2016

(65) Prior Publication Data

US 2016/0203228 A1    Jul. 14, 2016

(30) Foreign Application Priority Data

Jan. 9, 2015    (CN) .......................... 2015 1 0011902

(51) Int. Cl.
*G06F 16/9535*    (2019.01)
*G06F 16/28*    (2019.01)
(Continued)

(52) U.S. Cl.
CPC ............ *G06F 16/9535* (2019.01); *G06F 7/24* (2013.01); *G06F 16/1748* (2019.01); *G06F 16/289* (2019.01); *G06F 16/954* (2019.01)

(58) Field of Classification Search
CPC ......... G06F 17/30867; G06F 17/30156; G06F 17/30607; G06F 17/30873; G06F 7/24;
(Continued)

(56) References Cited

U.S. PATENT DOCUMENTS 5,414,812 A * 5/1995 Filip ....................... G06F 9/465
                                                          707/694
6,460,036 B1* 10/2002 Herz ................. G06F 17/30867
                                                          348/E7.056
(Continued)

FOREIGN PATENT DOCUMENTS

CN    102567346 A    7/2012

OTHER PUBLICATIONS

Li et al.; A tool for identifying attribute correspondences in heterogeneous databases using neural networks; Data & Knowledge Engineering 33 (2000) 49±84; Feb. 23, 1999; All pages.*
(Continued)

*Primary Examiner* — Jay A Morrison
*Assistant Examiner* — Antonio J Caiado
(74) *Attorney, Agent, or Firm* — Lee & Hayes, P.C.

(57) ABSTRACT

A method that includes establishing a layered attribute description network according to description values of the filtering requirements; extracting description values that are in the attribute description network; establishing a mapping relationship between the filtering requirements and the attribute description network, generating a path dependency graph; performing traversal comparison between the description values included in the description information of the data object to be filtered and description values in the path dependency graph; if all description values of one description path are included in the description information of the data object to be filtered, recording the description path as a matching path of the data object to be filtered; and determining a filtering requirement that the data object to be filtered meets. The techniques combine public description values and public description sub-paths based on a path dependency graph, reduce determinations in the filtering process and reduce the time of computation.

20 Claims, 5 Drawing Sheets

(51) Int. Cl.
*G06F 16/174* (2019.01)
*G06F 7/24* (2006.01)
*G06F 16/954* (2019.01)

(58) Field of Classification Search
CPC .... G06F 16/9535; G06F 16/953; G06F 16/95; G06F 16/289; G06F 16/28; G06F 16/1748; G06F 16/174; G06F 16/954
See application file for complete search history.

(56) References Cited

U.S. PATENT DOCUMENTS

| | | | |
|---|---|---|---|
| 6,505,228 B1* | 1/2003 | Schoening | G06F 9/4887 709/223 |
| 7,024,693 B2 | 4/2006 | Byrne | |
| 7,451,403 B1* | 11/2008 | Srinivasan | G06F 8/10 715/762 |
| 8,015,541 B1* | 9/2011 | Srinivasan | G06F 8/20 717/104 |
| 8,732,621 B2 | 5/2014 | Chu et al. | |
| 9,262,469 B1* | 2/2016 | Taylor | G06F 17/30386 |
| 9,639,805 B1* | 5/2017 | Feller | G06N 5/048 |
| 2002/0049835 A1* | 4/2002 | Mito | G06F 17/30867 709/219 |
| 2003/0014424 A1* | 1/2003 | Sokol | G06F 17/2745 |
| 2003/0088562 A1* | 5/2003 | Dillon | G06F 16/30 |
| 2004/0122844 A1* | 6/2004 | Malloy | G06F 17/30592 |
| 2004/0225670 A1* | 11/2004 | Cameron | G06F 17/30589 |
| 2004/0252121 A1* | 12/2004 | Bhatt | G06F 17/30554 345/440 |
| 2005/0010565 A1* | 1/2005 | Cushing | G06F 16/288 |
| 2005/0138109 A1* | 6/2005 | Redlich | G06F 17/30699 709/201 |
| 2007/0118496 A1* | 5/2007 | Bornhoevd | H04L 67/327 |
| 2007/0219992 A1* | 9/2007 | Bollinger | G06F 16/2465 |
| 2008/0222096 A1 | 9/2008 | Ungureanasu et al. | |
| 2009/0106732 A1* | 4/2009 | Hanson | G06F 16/2428 717/104 |
| 2011/0029933 A1* | 2/2011 | Chu | G06F 16/954 715/854 |
| 2011/0179047 A1* | 7/2011 | Zhang | H04L 41/16 707/754 |
| 2014/0095518 A1 | 4/2014 | Schneider et al. | |
| 2014/0244325 A1 | 8/2014 | Cartwright | |
| 2015/0149374 A1 | 5/2015 | Li et al. | |
| 2017/0322981 A1* | 11/2017 | Zhang | G06F 16/2465 |
| 2017/0371855 A1* | 12/2017 | Haines | G06F 17/243 |

OTHER PUBLICATIONS

PCT Search Report and Written Opinion dated Jun. 6, 2016 for PCT Application No. PCT/US16/12741, 8 pages.
Machine translation of Chinese Office Action dated Sep. 19, 2018 for Chinese apatent application No. 201510011902.X, a counterpart foreign application of U.S. Appl. No. 14/991,797, 31 pages.
Chinese Search Report dated Aug. 31, 2018, for Chinese patent application No. CN 201510011902.X, 2 pages.

* cited by examiner

FILTERING DATA OBJECTS

CROSS REFERENCE TO RELATED PATENT APPLICATION

This application claims foreign priority to Chinese Patent Application No. 201510011902.X filed on 9 Jan. 2015, entitled "Method, Apparatus and Electronic Device for Filtering Data Object", which is hereby incorporate by reference in its entirety.

TECHNICAL FIELD

The present disclosure relates to data filtering technologies, and, more specifically, to a method for filtering data objects. The present disclosure also relates to an apparatus and an electronic device for filtering data objects.

BACKGROUND

With the development of cloud computing and big data, various computation models have been developed in the field of big data computation, which are used to perform processing and computation in various data computing scenarios. Filtering out useful data from mass user data is more and more widely used. Especially, according to a large batch of filtering requirements that is input at a time, target user groups that meet each filtering requirement in the large batch of filtering requirements are filtered from the massive user data.

A conventional solution is implemented by using a Map-Reduce framework program. Map-Reduce is a software framework for parallel computation of large volumes of data, which may process billions of data inputs in a few hours. Basic steps of Map-Reduce include two stages: Map and Reduce. The main process of the Map stage mainly includes: (1) reading a large batch of filtering requirements, parsing expressions included therein, establishing a correspondence relationship between the expressions and Map tables, obtaining atomic expressions related to the Map tables and perform deduplication; (2) reading, piece by piece, mass user data that is recorded in the Map tables, and performing computation for each piece of user data cyclically by using the atomic expressions; and (3) according to an identification (ID) of a user in user data outputted from the Map tables, outputting, in the form of a list, at least one of the atomic expressions that the user satisfies. The main process of the Reduce stage mainly includes: (1) reading a large batch of filtering requirements, parsing expressions included therein, establishing a correspondence relationship between the expressions and Map tables, and obtaining atomic expressions that each filtering requirement needs to satisfy, to form an atomic expression list; (2) reading user data in the Map tables, combining user data of each user in the Map tables, and after the combination, obtaining a plurality of atomic expressions that users satisfy in the Map tables to form an atomic expression list; and (3) combining the results obtained in (1) and (2) to obtain a correspondence relationship between the users and the screening or filtering requirements, and outputting the correspondence relationship between the users and the filtering requirements.

The method for filtering data objects that is provided in the above conventional techniques has apparent deficiencies.

The method provided in the conventional techniques is implemented based on the Map-Reduce framework program. After a large batch of filtering requirements is input at a time, a quite large amount of data computation is required. Assuming that the number of filtering requirements is R, an average number of expressions for each filtering requirement is E, and the number of users is N, the total amount of data computation for implementing screening and classification of users is $R*E*N$, which is a quite large amount of computation and leads to a long time for computation. In addition, as the number of filtering requirements increases, data computation time required to complete screening and classification of large volumes of data increases sharply, which cannot meet service requirements of filtering large volumes of data.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method for filtering data objects to solve the problem of the method for filtering data objects in the conventional techniques, which is time-consuming and cannot meet service requirements of filtering a large batch of data objects. The present disclosure also provides an apparatus for filtering data objects, and an electronic device.

A method for filtering data objects provided by the present disclosure includes the following operations:

reading filtering requirements;

listing description values of the filtering requirements, and establishing an attribute description network, wherein the attribute description network is a layered network, each layer corresponds to one attribute field, each attribute field has at least one description value, and layers of the attribute description network have a hierarchical relationship from high to low levels;

reading description information of a data object to be filtered and extracting, from the description information of the data object to be filtered, at least one description value that is in the attribute description network and that is included in the description information of the data object to be filtered;

establishing a mapping relationship between the filtering requirements and the attribute description network, and generating a path dependency graph according to the mapping relationship; performing traversal comparison between the description values included in the description information of the data object to be filtered and description values in the path dependency graph; and in the traversal comparison process, if all description values of one description path are included in the description information of the data object to be filtered, recording the description path as a matching path of the data object to be filtered; and determining, according to matching paths of the data object to be filtered, a filtering requirement that the data object to be filtered meets.

Optionally, the operation of listing description values of the filtering requirements and establishing an attribute description network includes:

acquiring description information included in each filtering requirement;

classifying the description information according to attributes, wherein one corresponding attribute field is set for each attribute, and at least one piece of description information belonging to each attribute is normalized and then is respectively used as at least one description value under the attribute field corresponding to the attribute; and hierarchically arranging the attribute fields, according to a hierarchical relationship from high to low levels, to form the attribute description network, wherein each layer corresponds to one attribute field.

Optionally, the operation of hierarchically arranging the attribute fields according to a hierarchical relationship from high to low levels includes:

acquiring the number of description values under each of the attribute fields; and hierarchically arranging, in descending order of the numbers of description values under the attribute fields, the attribute fields in sequence according to the hierarchical relationship from high to low levels.

Optionally, the operation of hierarchically arranging the attribute fields according to a hierarchical relationship from high to low levels includes:

acquiring, according to nature of the attribute fields, attribute fields in which a single description value is to be selected; and placing, on top of other attribute fields, the attribute fields in which the single description value is to be selected, wherein an attribute field in which the single description value is to be selected refers to that according to nature of the attribute field, the description values included in the attribute field are mutually exclusive.

Optionally, in the attribute description network, different description values of a same layer are arranged in sequence according to a predetermined sorting criterion.

Optionally, the operation of establishing a mapping relationship between the filtering requirements and the attribute description network, and generating a path dependency graph according to the mapping relationship includes:

converting each filtering requirement into a description path expression form;

respectively generating at least one description path of each description path expression;

acquiring non-duplicative description paths of the filtering requirements to form a description path set; and mapping the description paths in the description path set to the attribute description network to form the path dependency graph.

Optionally, the description path includes at least one description value or includes a plurality of description values that have conjunction relationships; and different description values of one description path are located at different layers in the attribute description network, and different description values are arranged in descending order of levels of the layers at which the description values are located.

Optionally, the operation of mapping the description paths in the description path set to the attribute description network to form the path dependency graph includes:

sorting the description paths based on a sorting rule that a layer at a higher level has a higher priority and a description value appearing first in a same layer has a higher priority;

mapping the description paths to the attribute description network in sequence according to a result of the sorting; and combining parts that have completely identical high-layer description values in the description paths to generate the path dependency graph.

Optionally, the high-layer description values in the path dependency graph are completely identical, which includes that, starting downward from the highest-layer description values included in the description paths, all layers have identical description values.

Optionally, after the performing traversal comparison between the description values included in the description information of the data object to be filtered and description values in the path dependency graph, in the traversal comparison process, if the description information of the object to be filtered does not include a particular description value, skipping traversal of description paths in the path dependency graph that pass downward through the particular description value.

Optionally, in the operation of performing traversal comparison between the description values included in the description information of the data object to be filtered and description values in the path dependency graph, the traversal is a depth-first traversal.

Optionally, the operation of determining, according to matching paths of the data object to be filtered, a filtering requirement that the data object to be filtered meets is implemented in the following operations:

determining, according to a description path expression form of each filtering requirement, a description path included in each requirement; and if any description path included in a filtering requirement is included in the matching path of the data object to be filtered, determining that the data object to be filtered meets the filtering requirement.

Optionally, in the operation of determining, according to matching paths of the data object to be filtered, a filtering requirement that the data object to be filtered meets, all filtering requirements that the data object to be filtered meets are determined.

Optionally, the method comprises classifying the data object to be filtered as different categories according to the filtering requirements that the data object to be filtered meets.

The present disclosure also provides an apparatus for filtering data objects, which includes:

a filtering requirement reading unit that reads filtering requirements;

an attribute description network establishment unit that lists description values of the filtering requirements, and establishes an attribute description network, wherein the attribute description network is a layered network, each layer corresponds to one attribute field, each attribute field has at least one description value, and layers of the attribute description network have a hierarchical relationship from high to low levels;

a data-object-to-be-filtered reading unit that reads description information of a data object to be filtered; and extracts, from the description information of the data object to be filtered, at least one description value that is in the attribute description network and that is included in the description information of the data object to be filtered;

a path dependency graph generating unit that establishes a mapping relationship between the filtering requirements and the attribute description network, and generates a path dependency graph according to the mapping relationship;

a traversal comparison unit that performs traversal comparison between the description values included in the description information of the data object to be filtered and description values in the path dependency graph; and in the traversal comparison process, if all description values of one description path in the path dependency graph are included in the description information of the data object to be filtered, records the description path as a matching path of the data object to be filtered; and determines, according to matching paths of the data object to be filtered, a filtering requirement that the data object to be filtered meets; and a filtering requirement determining unit that determines, according to matching paths of the data object to be filtered, a filtering requirement that the data object to be filtered meets.

Optionally, the attribute description network establishment unit includes:

a description information acquiring sub-unit that acquires description information included in each filtering requirement;

a description information classifying sub-unit that classifies the description information according to attributes, wherein one corresponding attribute field is set for each attribute, and at least one piece of description information belonging to each attribute is normalized and then is respectively used as at least one description value under the attribute field corresponding to the attribute; and an attribute description network generating sub-unit that hierarchically arranges the attribute fields according to a hierarchical relationship from high to low levels, to form the attribute description network, where each layer corresponds to one attribute field.

Optionally, the attribute description network generating sub-unit includes:

a number-of-description-values acquiring sub-unit that acquires the number of description values under each of the attribute fields; and an attribute field hierarchical-arrangement sub-unit that hierarchically arranges, in descending order of the numbers of description values under the attribute fields, the attribute fields in sequence according to the hierarchical relationship from high to low levels.

Optionally, the attribute description network generating sub-unit includes:

a single-selection attribute field acquiring sub-unit that acquires, according to nature of the attribute fields, attribute fields in which a single description value is to be selected; and an attribute field permutation and acquiring sub-unit that places, on top of other attribute fields, the attribute fields in which a single description value is to be selected, wherein an attribute field in which a single description value is to be selected refers to that, according to nature of the attribute field, the description values included in the attribute field are mutually exclusive.

Optionally, the attribute description network generating sub-unit includes:

a description value sorting sub-unit that arranges different description values of a same layer in sequence according to a predetermined sorting criterion.

Optionally, the path dependency graph generating unit includes:

a filtering requirement conversion sub-unit that converts each filtering requirement into a description path expression form;

a description path generating sub-unit that respectively generates at least one description path of each description path expression;

a description path set acquiring sub-unit that acquires non-duplicative description paths of the filtering requirements to form a description path set; and a path dependency graph generating sub-unit that maps the description paths in the description path set to the attribute description network to form the path dependency graph.

Optionally, the path dependency graph generating sub-unit includes:

a description path sorting sub-unit that sorts the description paths based on a sorting rule that a layer at a higher level has a higher priority and a description value appearing first in a same layer has a higher priority;

a description path mapping sub-unit that maps the description paths to the attribute description network in sequence according to a result of the sorting; and a description path combining sub-unit that combines parts that have completely identical high-layer description values in the description paths to generate the path dependency graph.

The present disclosure also provides an electronic device, which includes:

a display;

one or more processors;

an input device; and a memory that store computer-executable instructions, where the computer-executable instructions are executable by the one or more processors to control the electronic device to perform the following operations:

reading filtering requirements by using the input device;

listing description values of the filtering requirements, and establishing an attribute description network, wherein the attribute description network is a layered network, each layer corresponds to one attribute field, each attribute field has at least one description value, and layers of the attribute description network have a hierarchical relationship from high to low levels;

reading description information of a data object to be filtered; and extracting, from the description information of the data object to be filtered, at least one description value that is in the attribute description network and that is included in the description information of the data object to be filtered;

establishing a mapping relationship between the filtering requirements and the attribute description network, and generating a path dependency graph according to the mapping relationship;

performing traversal comparison between the description values included in the description information of the data object to be filtered and description values in the path dependency graph; and in the traversal comparison process, if all description values of one description path in the path dependency graph are included in the description information of the data object to be filtered, recording the description path as a matching path of the data object to be filtered; and determining, according to matching paths of the data object to be filtered, a filtering requirement that the data object to be filtered meets.

Optionally, the filtering requirement includes description information, the description information is classified according to attributes, one corresponding attribute field is set for each attribute, and at least one piece of description information belonging to each attribute is normalized and then is respectively used as at least one description value under the attribute field corresponding to the attribute; and in the attribute description network, each layer corresponds to one attribute field, and the attribute fields are hierarchically arranged according to a hierarchical relationship from high to low levels.

Optionally, in the attribute description network, the attribute fields are hierarchically arranged, in descending order of the numbers of description values under the attribute fields, according to the hierarchical relationship from high to low levels.

Optionally, in the attribute description network, attribute fields in which a single description value is to be selected are placed on top of other attribute fields, where an attribute field in which a single description value is to be selected refers to that, according to nature of the attribute field, the description values included in the attribute field are mutually exclusive.

Optionally, in the attribute description network, different description values of a same layer are arranged in sequence according to a predetermined sorting criterion.

Optionally, the filtering requirement is used for conversion into a description path expression form, the description path expression is used to generate a description path, and non-duplicative description paths of the filtering requirements to form a description path set; and the description path expression form converted from each filtering requirement includes at least one description path.

Optionally, the description path includes at least one description value or includes a plurality of description values that have conjunction relationships; and different description values of one description path are located at different layers in the attribute description network, and different description values are arranged in descending order of levels of the layers at which the description values are located.

Optionally, in the path dependency graph, identical parts of description paths that have completely identical high-layer description values are combined, and branch paths towards lower layers are formed; and that high-layer description values are completely identical refers to that, starting downward from the highest-layer description values included in the description paths, all layers have identical description values.

Optionally, the traversal is depth-first traversal.

Optionally, there are one or more filtering requirements that the data object to be filtered meets, or there is no filtering requirement that the data object to be filtered meets.

Optionally, the data object to be filtered is classified into different categories according to the filtering requirements that the data object to be filtered meets.

A method for filtering data objects includes: reading filtering requirements; listing description values of the filtering requirements, and establishing an attribute description network, where the attribute description network is a layered network, each layer corresponds to one attribute field, each attribute field has at least one description value, and layers of the attribute description network have a hierarchical relationship from high to low levels; reading description information of a data object to be filtered; and extracting, from the description information of the data object to be filtered, at least one description value that is in the attribute description network and that is included in the description information of the data object to be filtered; establishing a mapping relationship between the filtering requirements and the attribute description network, and generating a path dependency graph according to the mapping relationship; performing traversal comparison between the description values included in the description information of the data object to be filtered and description values in the path dependency graph; in the traversal comparison process, if all description values of one description path in the path dependency graph are included in the description information of the data object to be filtered, recording the description path as a matching path of the data object to be filtered; and determining, according to matching paths of the data object to be filtered, a filtering requirement that the data object to be filtered meets.

As compared with the conventional techniques, the present disclosure has the following technical advantages.

In the method for filtering data objects provided by the present disclosure, an attribute description network is established according to filtering requirements that are read, a mapping relationship between the filtering requirements that are input and the attribute description network is established, a path dependency graph is generated according to the mapping relationship, traversal comparison is performed between the description values included in the description information of the data object to be filtered and description values in the path dependency graph to obtain a matching path of the data object to be filtered, so as to obtain a filtering requirement that the data object to be filtered meets. The method for filtering data objects combines the public description values and public description sub-paths based on a path dependency graph, reduces the amount of determinations in the filtering process, and reduces the time of data computation. Therefore, when filtering large volumes of data, much time is saved and the techniques of the present disclosure meet service requirements of filtering large volumes of data. In an example embodiment of the present disclosure, the computation time is further reduced by using hierarchical filtering and pruning.

DETAILED DESCRIPTION

Specific details are set forth in the following description to provide an understanding of the present disclosure. However, the present disclosure may be implemented in various manners different from those described in this specification, and those skilled in the art may make similar improvements without departing from the spirit of the present disclosure. Therefore, the present disclosure is not limited to specific implementations disclosed below.

A first example embodiment of the present disclosure provides an example method for filtering data objects, a second example embodiment of the present disclosure provides an example apparatus for filtering data objects, and a third embodiment of the present disclosure provides an example electronic device.

Figure 1:
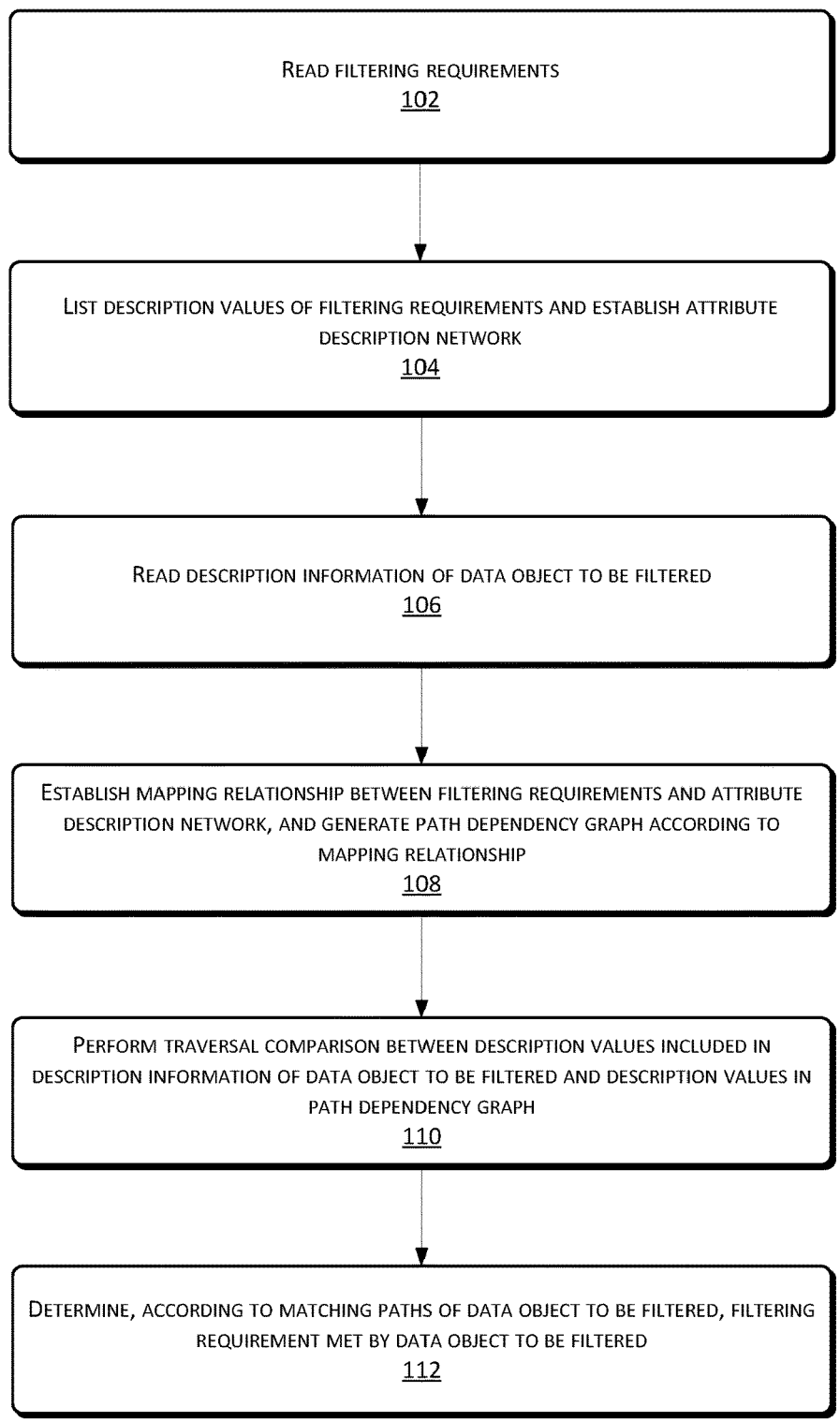
FIG. 1 is a processing flowchart of an example method for filtering data objects according to a first example embodiment of the present disclosure.
Figure 2:
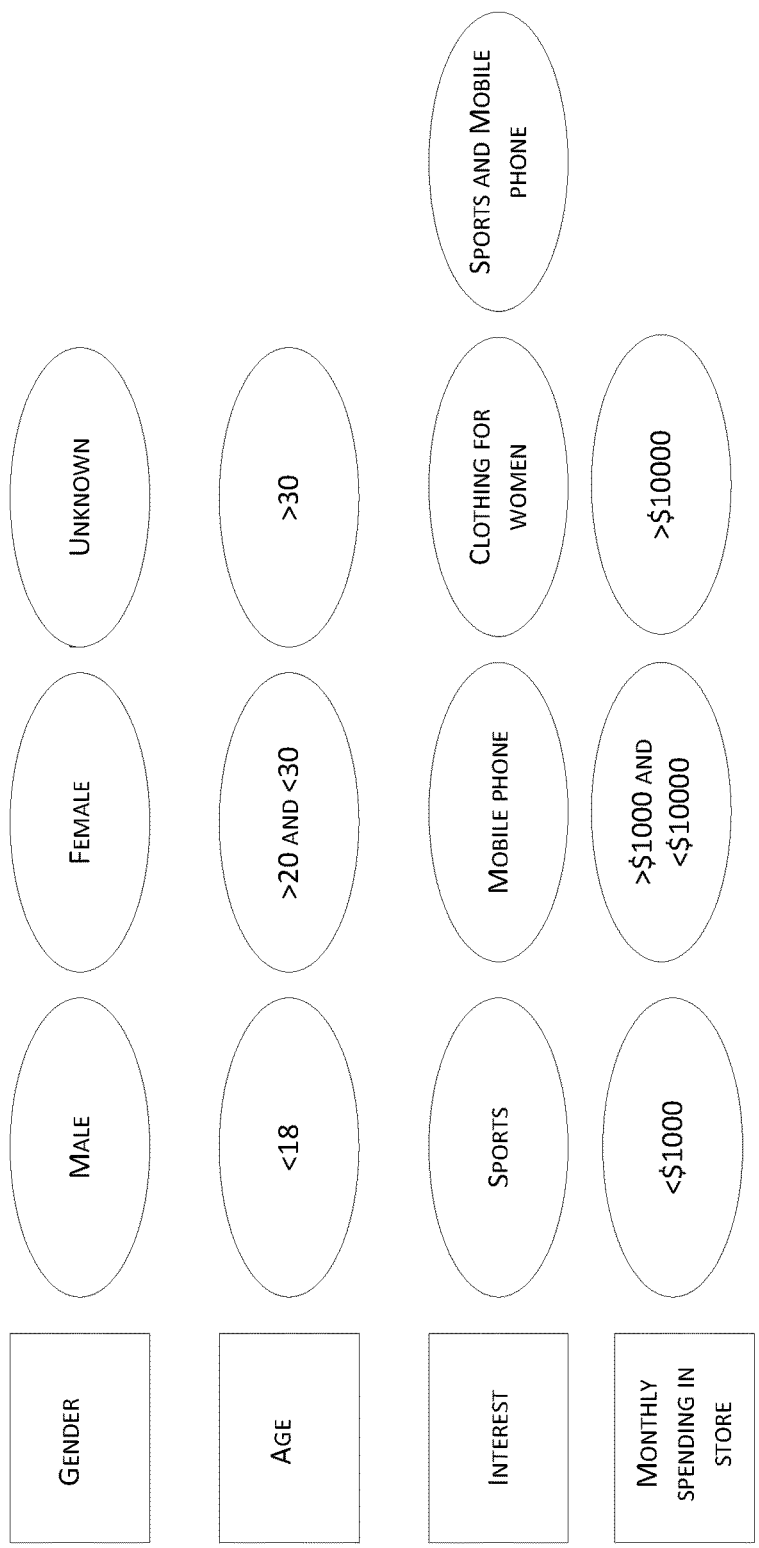
FIG. 2 is a schematic diagram of an example attribute description network according to the first example embodiment of the present disclosure.
Figure 3:
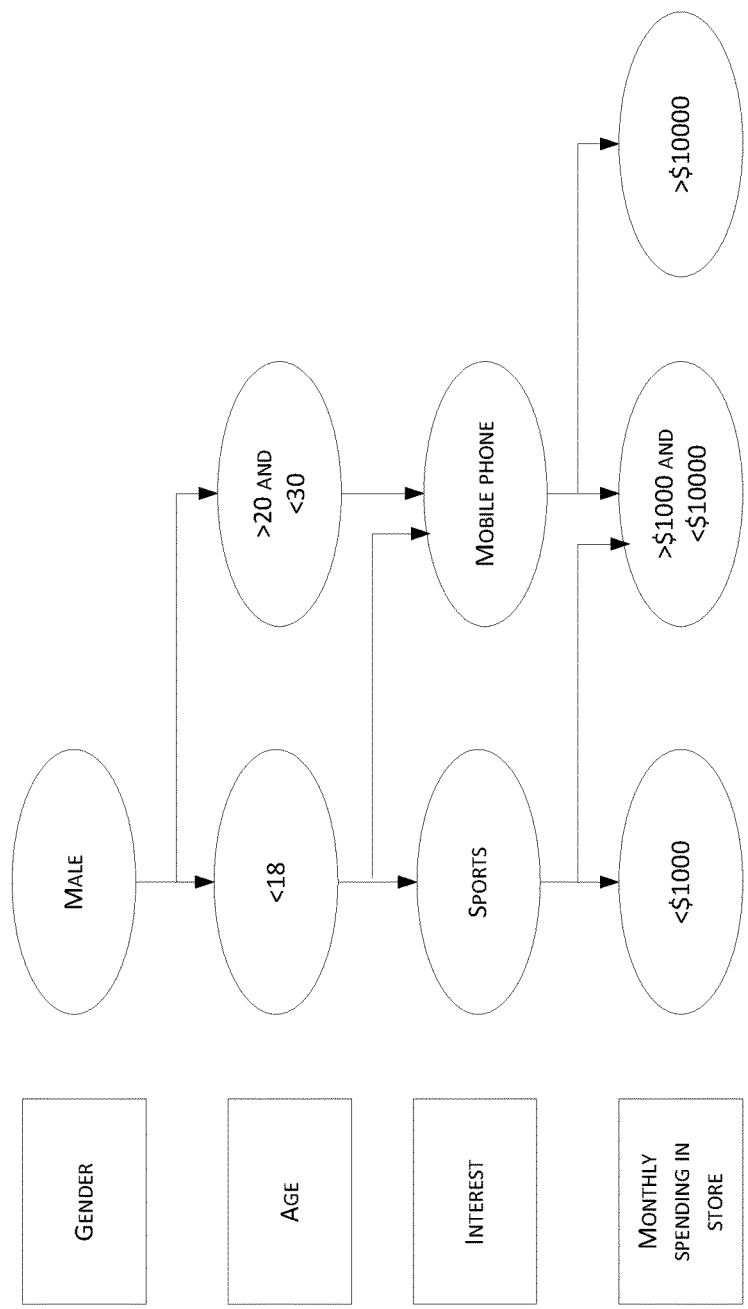
FIG. 3 is a schematic diagram of an example path dependency graph according to the first example embodiment of the present disclosure.

With respect to the example method for filtering data objects that is provided in the first example embodiment of the present disclosure, refer to FIG. 1 to FIG. 3, which show processing flowcharts of the example method for filtering data objects.

The method for filtering data objects that is provided in this example embodiment and operations of the method are described below with reference to FIG. 1. In addition, the order of specific operations of the method for filtering data objects that is provided in this example embodiment is as shown in FIG. 1.

In this example embodiment, it is assumed that, in an application scenario, a large batch of filtering requirements of a merchant is read at one time by an e-commerce platform. Target users that meet the filtering requirements are filtered out from mass users. Certainly, the method for filtering data objects that is provided by the present disclosure may also be applied to other occasions, which is not limited herein.

At 102, filtering requirements are read.

In this embodiment, the filtering requirements refer to filtering conditions that are input by the merchant to the e-commerce platform and used to filter target users from mass users.

For example, in the e-commerce platform, if the merchant wants to filter all users whose genders are male, whose ages are under 18 years old, whose interest are sports, and whose monthly spending on goods from the store of the merchant are less than $1000, from mass users according to user information. The gender being male, the age being under 18 years old, the interest being sports and the monthly spending in the store being less than $1000 are the filtering condition input by the merchant, that is, are the filtering requirement; in addition, user information of target users that the merchant wants to acquire needs to satisfy the following four conditions at the same time: the gender being male, the age being under 18 years old, the interest being sports and the monthly spending in the store being less than $1000.

It should be noted that in this example embodiment, reading the filtering requirements may refer to reading a large batch of filtering requirements at one time, wherein the filtering requirements include various description information for describing target objects.

At 104, description values of the filtering requirements are listed to establish an attribute description network.

The attribute description network refers to a method for expressing user information of a user.

The attribute description network may be established according to the following operations:

(1) description information included in each filtering requirement is acquired.

The description information included in the filtering requirement refers to text or image information that is used to describe the filtering requirement.

For example, if the filtering requirements of the merchant are: the gender being male, the age being under 18 years old, the interest being sports and the monthly spending in the store being less than $1000, the description information included in the filtering requirement may be expressed as "gender=male and age<18 and interest=sports and the monthly spending in the store <$1000".

In this operation, the description information included in each filtering requirement of the large batch of filtering requirements that are read in the foregoing operation 102 is acquired, so as to prepare data for establishing the attribute description network according to the description information included in each filtering requirement in the following operations (2) and (3).

It should be noted that this operation may further include parsing and optimizing the description information included in the filtering requirements.

In this example embodiment, parsing the description information refers to performing syntax analysis of the description information to check whether the description information is valid, and further includes optimizing the order in which operations included in the description information are performed.

Optimizing the description information comprises optimizing the order in which operations included in the description information are performed, and specifically refers to equivalently transforming all "or" operations included in the description information into one or more logical conjunction operations.

For example, description information "(A or B) and C" that includes an "or" operation is equivalently transformed into two "and" operations: "A and C", and "B and C".

In addition, optimizing the description information may further include performing semantic analysis and optimization for the description information, wherein performing semantic analysis and optimization for the description information may include: performing de-duplication of description information, performing de-duplication of multiple pieces of duplicative description information and keeping one (such as a random one) of these pieces; and analyzing a inclusion relationship between the description information.

For example, for description information "(A or B) and C" and description information "A and B and C", the former contains the latter, that is, target users that are filtered out according to a filtering requirement including the description information "(A or B) and C" include all target users that are filtered out according to a filtering requirement including the description information "A and B and C".

In addition, the parsing and optimization of the description information included in the filtering requirements may also be implemented in other manners, which is not limited herein.

(2) The description information is classified according to attributes, wherein one corresponding attribute field is set for each attribute, and at least one piece of description information belonging to each attribute is normalized and then is respectively used as at least one description value under the attribute field corresponding to the attribute.

The description information included in the filtering requirements that is acquired in the foregoing operation (1) is classified into multiple categories according to attributes of the description information, one corresponding attribute field is set for each attribute, at least one piece of description information belonging to each attribute is normalized, and the normalized description information is respectively used as a description value under the attribute field corresponding to the attribute.

For example, if the description information included in the filtering requirement is: "gender=male and age<18 and interest=sports and the monthly spending in the store <$1000", the description information included in the filtering requirement is classified into four categories according to attributes: gender, age, interest and the monthly spending in the store, wherein the description information belonging to the attribute "gender" is "gender=male", the description information belonging to the attribute "age" is "age<18", the description information belonging to the attribute "interest" is "interest=sports", and the description information belonging to the attribute "the monthly spending in the store" is "the monthly spending in the store <$1000".

In addition, the description information "gender=male" belonging to the attribute "gender" is normalized as "male", and is used as a description value under the attribute field "gender"; the description information "age<18" belonging to the attribute "age" is normalized as "<18", and is used as a description value under the attribute field "age"; the description information "interest=sports" belonging to the attribute "interest" is normalized as "sports", and is used as a description value under the attribute field "interest"; and the description information "the monthly spending in the store <$1000" belonging to the attribute "the monthly spending in the store" is normalized as "<$1000", and is used as a description value under the attribute field "the monthly spending in the store".

(3) The attribute fields are hierarchically arranged, according to a hierarchical relationship from high to low levels, to form the attribute description network, wherein each layer corresponds to one attribute field.

The attribute description network may be abstracted as a hierarchical filtering model, and filtering at a current level needs to be completed before the filtering proceeds to a next lower level. Therefore, attribute fields corresponding to description values with strong filtering capacities (which filter more data than other attribute fields) are placed at layers of higher levels, so as to reduce the amount of data computation, thereby speeding up the computation.

In this example embodiment, the number of description values under each of the attribute fields that are obtained in the foregoing operation (2) is acquired. The attribute fields that are obtained in the foregoing operation (2) are hierarchically arranged, in descending order of the numbers of description values under the attribute fields, in sequence according to the hierarchical relationship from high to low levels. Accordingly, the attribute description network is formed, in which each layer corresponds to one attribute field.

For example, when the attribute fields that are obtained in the foregoing operation (2) are hierarchically arranged according to the hierarchical relationship from high to low levels, the following rule may be used:

acquiring from the attribute fields, according to nature of the attribute fields, attribute fields in which a single description value is to be selected; and placing, on top of other attribute fields, the attribute fields in which a single description value is to be selected, wherein an attribute field in which a single description value is to be selected refers to that, according to nature of the attribute field, the description values included in the attribute field are mutually exclusive. For example, the description values "male, female, unknown" under the attribute field "gender" are mutually exclusive, and for any user, the attribute "gender" is fixed; therefore, user information of a user contains only one of "male", "female", and "unknown", and cannot contain two or more of "male", "female", and "unknown".

For a single-selection attribute field, among all description values included in the attribute field, one and only one description value is true; while for a non-single-selection attribute field, one or more description values may be true, and all the description values included in the attribute field need to be traversed during data computation, which takes more time than that required to traverse a single-selection attribute field. Therefore, by placing the single-selection attribute field on top of other attribute fields (that is, non-single-selection attribute fields) (such as in the hierarchical relationship), the amount of data computation required for other attribute fields after filtering is performed on the single-selection attribute field is reduced effectively, thereby reducing the time required by computation, and improving the performance.

In addition, it should be noted that in the attribute description network, different description values under an attribute field corresponding to a same layer are arranged in sequence according to a predetermined sorting criterion.

To sum up, the attribute description network has the following characteristics:

each layer corresponds to one attribute field, each attribute field has at least one description value, and all layers have a hierarchical relationship from high to low levels;

the attribute fields are hierarchically arranged, in descending order of the numbers of description values, in sequence according to a hierarchical relationship from high to low levels, and the attribute field in which a single description value is to be selected is placed on top of other attribute fields; and different description values under an attribute field corresponding to each layer are arranged in sequence according to a predetermined sorting criterion.

For example, FIG. 2 is a schematic diagram of an example attribute description network.

In addition, the foregoing operation of hierarchically arranging the attribute fields according to a hierarchical relationship from high to low levels to form the attribute description network may also be implemented by using other methods different from that used in this embodiment, which is not limited herein.

At 106, description information of a data object to be filtered is read.

The description information of the data object to be filtered refers to user information of mass users in the e-commerce platform.

In this operation, description information of mass data objects to be filtered is read, and from the description information of each data object to be filtered, at least one description value that is in the attribute description network and that is included in the description information is extracted.

For example, if user information of a user A is "gender=male, age<18, interest=sports, the monthly spending in the store of a merchant >$1000", extracted description values of the user A in the attribute description network shown in FIG. 2 are: "male, <18, sports, >$1000".

At 108, a mapping relationship between the filtering requirements and the attribute description network is established, and a path dependency graph is generated according to the mapping relationship.

An example implementation is as follows:

(1) Each filtering requirement is converted into a description path expression form.

In this operation, according to the large batch of filtering requirements that are read in the foregoing operation 102, each filtering requirement in the large batch of filtering requirements is converted into a description path expression form, and the filtering requirement corresponds to the description path expression on a one-to-one basis.

(2) at least one description path of each description path expression is respectively generated.

After the description path expression forms are obtained according to the foregoing operation (1), at least one description path of each description path expression is generated respectively according to the description path expressions.

(3) A description path set formed by non-duplicative description paths of the filtering requirements is acquired.

After the description paths of the filtering requirements are obtained according to the operation (2), duplicative description paths in a set including the description paths of the filtering requirements are removed to form a description path set of the filtering requirements (that is, the large batch of filtering requirements).

The description path includes at least one description value or includes a plurality of description values that have conjunction relationships; and different description values of one description path are located at different layers in the attribute description network, and different description values are arranged in descending order of levels of the layers at which the description values are located.

(4) The description paths in the description path set are mapped to the attribute description network to form the path dependency graph.

After the description path set of the filtering requirements (that is, the large batch of filtering requirements) is obtained according to the foregoing operation (3), in this operation, the description paths in the description path set are mapped to the attribute description network to form the path dependency graph.

An example implementation is as follows:

a. sorting, according to the description path set of the filtering requirements (that is, the large batch of filtering requirements) that is obtained in the foregoing (3), all the description paths in the description path set based on a sorting rule that a layer at a higher level has a higher priority and a description value appearing first in a same layer has a higher priority;

b. mapping, according to a result of the sorting of all the description path in the description path set in the foregoing step a, all the description path in the description path set to the attribute description network in sequence; and c. combining parts that have completely identical high-layer description values in the description paths to generate the path dependency graph.

The high-layer description values are completely identical refers to that: starting downward from the highest-layer description values included in the description paths, all layers have identical description values.

For example, the description path set includes: a description path A and description path B, where the description path A is: "male and <18 and sports and <$1000", and the description path B is: "male and <18 and sports and >$1000 and <$10000".

The description path A and the description path B have identical high-layer description values (male, <18, sports).

The high-layer description values (male, <18, sports) of the description path A and the description path B are combined to form a path dependency graph. FIG. 3 is a schematic diagram of the example path dependency graph.

In addition, the path dependency graph may also be implemented by using other methods, which is not limited herein.

At 110, a traversal comparison is performed between the description values included in the description information of the data object to be filtered and description values in the path dependency graph.

According to the description information of the mass data objects to be filtered that is read in the foregoing 106 and the path dependency graph that is obtained in the foregoing 108, in this operation, traversal comparison is performed between the description values included in the description information of the data object to be filtered and description values in the path dependency graph, and if all description values of one description path are included in the description information of the data object to be filtered, the description path is recorded as a matching path of the data object to be filtered, so as to obtain a matching path of each data object to be filtered among the mass data objects to be filtered.

With respect to each data object to be filtered, there may be one or more matching paths or there may be no matching path.

It should be noted that in this example embodiment, traversal comparison is performed between the description values included in the description information of the data object to be filtered and the description values in the path dependency graph by using a depth-first traversal.

An example implementation process of the depth-first traversal is described below by using the path dependency graph shown in FIG. 3. The depth-first traversal provided in this example embodiment is described below with reference to the path dependency graph shown in FIG. 3.

In the path dependency graph shown in FIG. 3, according to a hierarchical relationship from high to low and the arrangement of description values in a left-to-right order, the path dependency graph includes the following description paths in sequence:

a description path 1: "male and <18 and sports and <$1000";

a description path 2: "male and <18 and sports and >$1000 and <$10000";

a description path 3: "male and <18 and sports and >$10000";

a description path 4: "male and <18 and mobile phone and <$1000";

a description path 5: "male and <18 and mobile phone and >$1000 and <$10000";

a description path 6: "male and <18 and mobile phone and >$10000";

a description path 7: "male and >20 and <30 and sports and <$1000";

a description path 8: "male and >20 and <30 and sports and >$1000 and <$10000";

a description path 9: "male and >20 and <30 and sports and >$10000";

a description path 10: "male and >20 and <30 and mobile phone and <$1000";

a description path 11: "male and >20 and <30 and mobile phone and >$1000 and <$10000"; and a description path 12: "male and >20 and <30 and mobile phone and >$10000";

For example, when traversal comparison is performed against the description values in the path dependency graph based on a depth-first traversal rule:

the description information of the data object to be filtered is x, and assuming that the description information x of the data object to be filtered includes all the description values in the path dependency graph shown in FIG. 3, the order of comparison based on the depth-first traversal rule is:

"male"->"<18"->"sports"->"<$1000"->">$1000 and <$10000"->">$10000"->"mobile phone"->"<$1000"->">$1000 and <$10000"->">$10000"->"20 and <30"->"sports"->"<$1000"->">$1000 and <$10000"->">$10000"->"mobile phone"->"<$1000"->">$1000 and <$10000"->">$10000".

The order of comparison of the depth-first traversal rule is based on an assumption, and is for the purpose of fully describing the rule for the order when traversal is performed by using the depth-first traversal.

Generally, in the traversal comparison process, if the description information of the object to be filtered does not include a description value, traversal of description paths in the path dependency graph that pass downward through the description value is skipped.

For example, in the path dependency graph shown in FIG. 3, the description information x of the data object to be filtered does not include the description value "<18" of the attribute field "age", all description paths that pass through the description value "<18" (including the description path 1 to the description path 6) are ignored, that is, the description path 1 to the description path 6 do not need to be traversed, and only the description path 7 to the description path 12 need to be traversed by using the depth-first traversal.

If all description values of one description path are included in the description information of the data object to be filtered, the description path is recorded as a matching path of the data object to be filtered, that is, the data object to be filtered is marked with a label, which is a label including the matching path.

If there is one matching path for the data object to be filtered, the data object to be filtered is marked with a label including the matching path.

If there are multiple (greater than or equal to 2) matching paths for the data object to be filtered, the data object to be filtered is respectively marked with labels including the matching paths.

If there is no matching path for the data object to be filtered, it indicates that the data object to be filtered is invalid data, and no processing needs to be performed.

At 112, according to matching paths of the data object to be filtered, a filtering requirement met by the data object to be filtered is determined.

In the foregoing operation 110, through comparison according to the depth-first traversal algorithm, the matching path of each data object to be filtered among the mass data objects to be filtered is obtained. In this operation, a filtering requirement met by each data object to be filtered among the mass data objects to be filtered is determined according to the matching path of each data object to be filtered, which is obtained in the foregoing operation 110.

An example implementation is as follows:

(1) According to a description path expression form of each filtering requirement, a description path included in the filtering requirement is determined.

At least one description path included in each filtering requirement in the large batch of filtering requirements is determined according to the description path expression form of each filtering requirement in the large batch of filtering requirements that is obtained in the foregoing operation 108, and each description path belongs to at least one filtering requirement.

(2) If any description path included in a filtering requirement is included in the matching path of the data object to be filtered, the data object to be filtered is determined to meet the filtering requirement.

According to the matching path of the data object to be filtered that is obtained in the foregoing operation 110 and according to the description path that is included in each filtering requirement and that is determined in the foregoing step (1), the data object to be filtered is separately classified into categories that correspond to the filtering requirements to which the matching path belongs, that is, the filtering requirement that each data object to be filtered meets is obtained, wherein the number of filtering requirements that each data object to be filtered meets may be one or more, or may be zero.

The above process is repeated, until the mass data objects to be filtered that are read in the foregoing operation 106 are all classified into categories corresponding to the filtering requirements.

Accordingly, a set of data objects to be filtered under the category of each filtering requirement in the large batch of filtering requirements, which are read in 102, is obtained.

In addition, the foregoing implementation may also be implemented by using other methods different from that used in this example embodiment, which is not limited herein.

An example apparatus for filtering data objects that is provided in the second example embodiment of the present disclosure is as follows:

In the foregoing example embodiment, a method for filtering data objects is provided; correspondingly, the present disclosure also provides an apparatus for filtering data objects.

Figure 4:
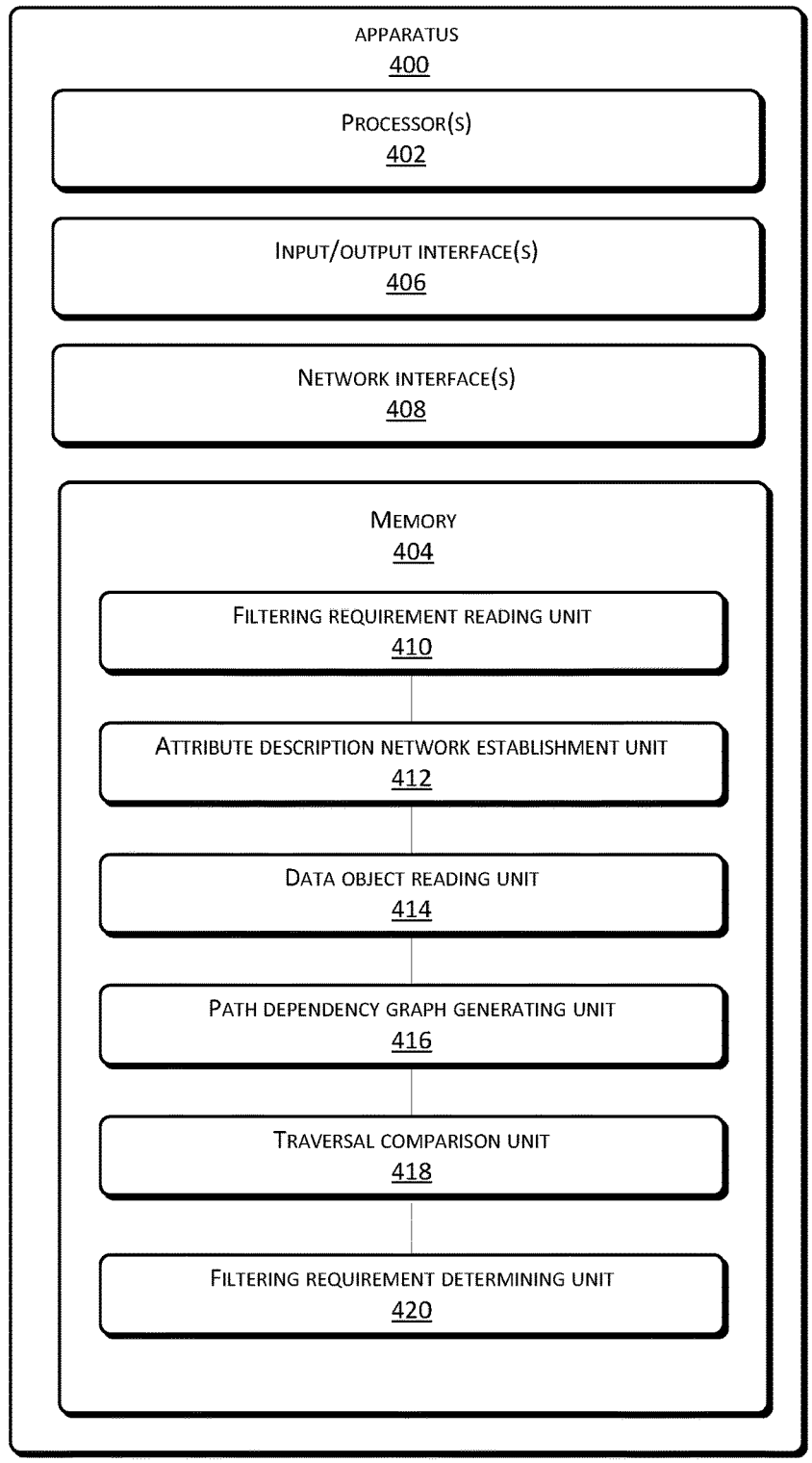
FIG. 4 is a schematic diagram of an example apparatus for filtering data objects according to a second example embodiment of the present disclosure.

FIG. 4 is a schematic diagram of an example apparatus for filtering data objects according to this embodiment. The apparatus embodiment is basically similar to the method embodiment, and therefore is briefly described. For related portions, reference may be made to the corresponding description in the method embodiment. The apparatus embodiment described below is merely exemplary.

An apparatus 400 for filtering data objects according to the present disclosure may include one or more processor(s) 402 or data processing unit(s) and memory 404. The apparatus 400 may further include one or more input/output interface(s) 406, and network interface(s) 408. The memory 404 is an example of computer-readable media.

The memory 404 may store therein a plurality of modules or units including:

a filtering requirement reading unit 410 that reads filtering requirements;

an attribute description network establishment unit 412 that lists description values of the filtering requirements, and establishes an attribute description network, wherein the attribute description network is a layered network, each layer corresponds to one attribute field, each attribute field has at least one description value, and layers of the attribute description network have a hierarchical relationship from high to low levels;

a data object reading unit 414 that reads description information of a data object to be filtered; and extracts, from the description information of the data object to be filtered, at least one description value that is in the attribute description network and that is included in the description information of the data object to be filtered;

a path dependency graph generating unit 416 that establishes a mapping relationship between the filtering requirements and the attribute description network, and generates a path dependency graph according to the mapping relationship;

a traversal comparison unit 418 that performs traversal comparison between the description values included in the description information of the data object to be filtered and description values in the path dependency graph; in the traversal comparison process, if all description values of one description path in the path dependency graph are included in the description information of the data object to be filtered, records the description path as a matching path of the data object to be filtered; and determines, according to matching paths of the data object to be filtered, a filtering requirement that the data object to be filtered meets; and a filtering requirement determining unit 420 that determines, according to matching paths of the data object to be filtered, a filtering requirement that the data object to be filtered meets.

Optionally, the attribute description network establishment unit 412 includes:

a description information acquiring sub-unit that acquires description information included in each filtering requirement;

a description information classifying sub-unit that classifies the description information according to attributes, wherein one corresponding attribute field is set for each attribute, and at least one piece of description information belonging to each attribute is normalized and then is respectively used as at least one description value under the attribute field corresponding to the attribute; and an attribute description network generating sub-unit that hierarchically arranges the attribute fields according to a hierarchical relationship from high to low levels to form the attribute description network, where each layer corresponds to one attribute field.

Optionally, the attribute description network generating sub-unit includes:

a number-of-description-values acquiring sub-unit that acquires the number of description values under each of the attribute fields; and an attribute field hierarchical-arrangement sub-unit that hierarchically arranges, in descending order of the numbers of description values under the attribute fields, the attribute fields in sequence according to the hierarchical relationship from high to low levels.

Optionally, the attribute description network generating sub-unit includes:

a single-selection attribute field acquiring sub-unit that acquires, according to nature of the attribute fields, attribute fields in which a single description value is to be selected; and an attribute field permutation and acquiring sub-unit that places, on top of other attribute fields, the attribute fields in which a single description value is to be selected, wherein an attribute field in which a single description value is to be selected refers to that, according to nature of the attribute field, the description values included in the attribute field are mutually exclusive.

Optionally, the attribute description network generating sub-unit includes:

a description value sorting sub-unit that arranges different description values of a same layer in sequence according to a predetermined sorting criterion.

Optionally, the path dependency graph generating unit 416 includes:

a filtering requirement conversion sub-unit that converts each filtering requirement into a description path expression form;

a description path generating sub-unit that respectively generates at least one description path of each description path expression;

a description path set acquiring sub-unit that acquires non-duplicative description paths of the filtering requirements to form a description path set; and a path dependency graph generating sub-unit that maps the description paths in the description path set to the attribute description network to form the path dependency graph.

Optionally, the path dependency graph generating sub-unit includes:

a description path sorting sub-unit that sorts the description paths based on a sorting rule that a layer at a higher level has a higher priority and a description value appearing first in a same layer has a higher priority;

a description path mapping sub-unit that maps the description paths to the attribute description network in sequence according to a result of the sorting; and a description path combining sub-unit that combines parts that have completely identical high-layer description values in the description paths, to generate the path dependency graph.

An example electronic device that is provided in the third embodiment of the present disclosure is as follows:

In the foregoing embodiments, a method for filtering data objects is provided, and a corresponding apparatus for filtering data objects is also provided. In addition, the present disclosure provides an electronic device that is used to implement the method for filtering data objects.

Figure 5:
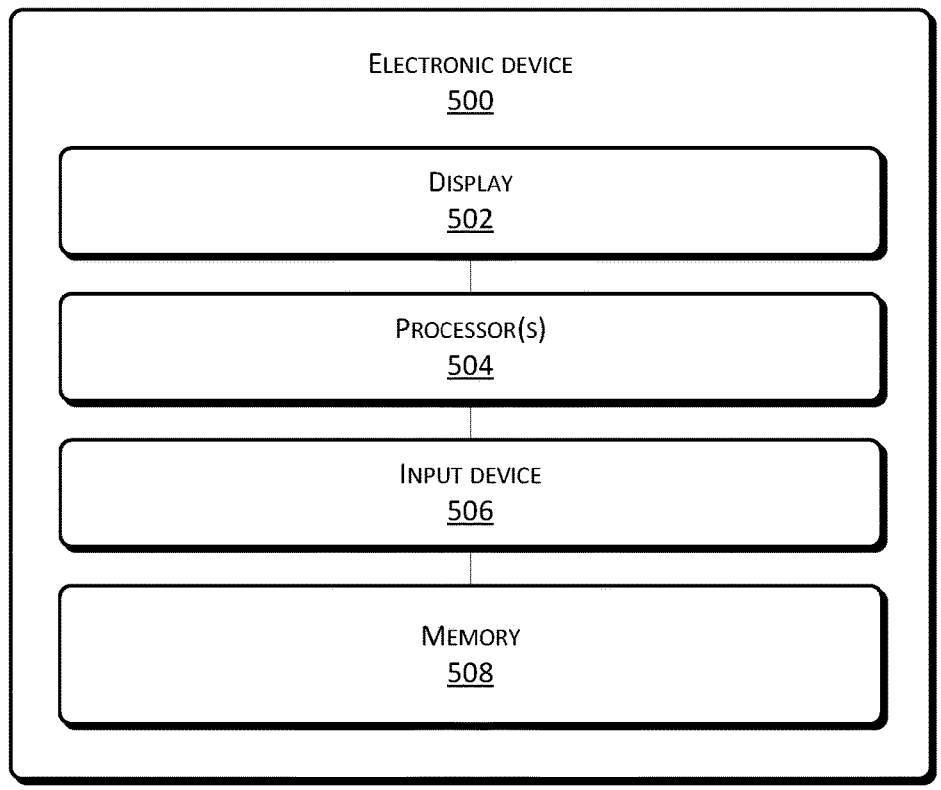
FIG. 5 is a schematic diagram of an example electronic device according to a third embodiment of the present disclosure.

FIG. 5 is a schematic diagram of an example electronic device according to according to this embodiment. The example embodiment of the electronic device is briefly described, and for related portions, reference may be made to the corresponding description in the foregoing method embodiment. The embodiment of the electronic device described below is merely exemplary.

An electronic device 500 according to the present disclosure includes:

a display 502;

one or more processor(s) 504 or data processing unit(s);

an input device 506; and one or more memories 508 that store computer-executable instructions that are executable by the one or more processor(s) 504 to control the electronic device 500 to perform the following operations:

reading filtering requirements by using the input device 506;

listing description values of the filtering requirements, and establishing an attribute description network, where the attribute description network is a layered network, each layer corresponds to one attribute field, each attribute field has at least one description value, and layers of the attribute description network have a hierarchical relationship from high to low levels;

reading description information of a data object to be filtered; and extracting, from the description information of the data object to be filtered, at least one description value that is in the attribute description network and that is included in the description information of the data object to be filtered;

establishing a mapping relationship between the filtering requirements and the attribute description network, and generating a path dependency graph according to the mapping relationship;

performing traversal comparison between the description values included in the description information of the data object to be filtered and description values in the path dependency graph; and, in the traversal comparison process, if all description values of one description path in the path dependency graph are included in the description information of the data object to be filtered, recording the description path as a matching path of the data object to be filtered; and determining, according to matching paths of the data object to be filtered, a filtering requirement that the data object to be filtered meets.

Optionally, the filtering requirement includes description information, the description information is classified according to attributes, one corresponding attribute field is set for each attribute, and at least one piece of description information belonging to each attribute is normalized and then is respectively used as at least one description value under the attribute field corresponding to the attribute; and in the attribute description network, each layer corresponds to one attribute field, and the attribute fields are hierarchically arranged according to a hierarchical relationship from high to low levels.

Optionally, in the attribute description network, the attribute fields are hierarchically arranged, in descending order of the numbers of description values under the attribute fields, according to the hierarchical relationship from high to low levels.

Optionally, in the attribute description network, attribute fields in which a single description value is to be selected are placed on top of other attribute fields, where an attribute field in which a single description value is to be selected refers to that, according to nature of the attribute field, the description values included in the attribute field are mutually exclusive.

Optionally, in the attribute description network, different description values of a same layer are arranged in sequence according to a predetermined sorting criterion.

Optionally, the filtering requirement is used for conversion into a description path expression form, the description path expression is used to generate a description path, and non-duplicative description paths of the filtering requirements form a description path set; and the description path expression form converted from each filtering requirement includes at least one description path.

Optionally, the description path includes at least one description value or includes a plurality of description values that have conjunction relationships; and different description values of one description path are located at different layers in the attribute description network, and different description values are arranged in descending order of levels of the layers at which the description values are located.

Optionally, in the path dependency graph, identical parts of description paths that have completely identical high-layer description values are combined to form branch paths towards lower layers; and that high-layer description values are completely identical refers to that: starting downward from the highest-layer description values included in the description paths, all layers have identical description values.

Optionally, the traversal is depth-first traversal.

Optionally, there are one or more filtering requirements that the data object to be filtered meets, or there is no filtering requirement that the data object to be filtered meets.

Optionally, the data object to be filtered is classified into different categories according to the filtering requirements that the data object to be filtered meets.

Although the present disclosure has been described above through example embodiments, these embodiments are not intended to limit the present disclosure. Various possible variations and modifications may be made by those skilled in the art without departing from the spirit and scope of the present disclosure. Therefore, the protection scope of the present disclosure shall be subject to the scope defined by the claims of the present disclosure.

In a typical configuration, a computation device includes one or more central processing units (CPUs), input/output interfaces, network interfaces, and memories.

The memory may include the following forms of a computer readable medium: a volatile memory, a random access memory (RAM) and/or a non-volatile memory, for example, a read-only memory (ROM) or flash RAM. The memory is an example of the computer readable medium.

The computer readable medium includes volatile and non-volatile, mobile and non-mobile media, and can use any method or technology to store information. The information may be a computer readable instruction, a data structure, a module of a program or other data. Examples of storage media of the computer include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be used for storing computer accessible information. According to the definition herein, the computer readable medium does not include transitory computer readable media (transitory media), for example, a modulated data signal and carrier.

As will be appreciated by those skilled in the art, the embodiments of the present disclosure may be embodied as a method, system, or computer program product. Accordingly, the present disclosure may take the form of an entirely hardware embodiment, or an entirely software embodiment, or an embodiment combining software and hardware aspects. Furthermore, the present disclosure may take the form of a computer program product that is implemented on one or more computer readable medium (including, but not limited to, magnetic disk storage, CD-ROM and optical storage) containing computer-executable instructions.

What is claimed is:

1. A method comprising:
reading filtering requirements;
acquiring description information included in each filtering requirement;
performing syntax analysis of the acquired description information to check whether the acquired description information is valid;
transforming all or-operations included in the acquired description information into one or more logical conjunction operations;
listing description values of the filtering requirements to establish an attribute description network, the attribute description network being a layered network, a respective layer corresponding to a respective attribute field, the respective attribute field having at least one description value, layers of the attribute description network having a hierarchical relationship from high to low level;
reading description information of a data object to be filtered;
extracting, from the description information of the data object, description values including at least one description value that is in the attribute description network;
reducing data computational amount by:
establishing a mapping relationship between the filtering requirements and the attribute description network;
generating a path dependency graph according to the mapping relationship;
performing a traversal comparison between the description values included in the description information of the data object and description values in the path dependency graph, the traversal comparison including a depth-first traversal; and when the description information of the data object to be filtered does not include a description value, skipping traversal of description paths in the path dependency graph that pass downward through the description value.

2. The method of claim 1, further comprising:

during a process of performing the traversal comparison, recording a description path as a matching path of the data object in response to determining that description values of the description path are included in the description information of the data object.

3. The method of claim 2, further comprising determining, according to the matching path of the data object, a filtering requirement that the data object meets.

4. The method of claim 1, wherein the listing description values of the filtering requirements to establish the attribute description network includes:

classifying the acquired description information according to attributes, a corresponding attribute field being set for each attribute, at least one piece of acquired description information belonging to each attribute being normalized and respectively used as at least one description value under a respective attribute field corresponding to a respective attribute; and hierarchically arranging attribute fields according to the hierarchical relationship to form the attribute description network, a respective layer corresponding to the respective attribute field.

5. The method of claim 4, wherein the hierarchically arranging the attribute fields according to the hierarchical relationship includes:

acquiring a number of description values under each of the attribute fields; and hierarchically arranging, in descending order of the numbers of description values under the attribute fields, the attribute fields in sequence according to the hierarchical relationship.

6. The method of claim 4, wherein the hierarchically arranging the attribute fields according to the hierarchical relationship includes:

acquiring, according to nature of the attribute fields, attribute fields in which a single description value is to be selected; and placing, on top of other attribute fields in the hierarchical relationship, the attribute fields in which the single description value is to be selected, wherein an attribute field in which a single description value is to be selected refers to that, according to nature of the attribute field, description values included in the attribute field are mutually exclusive.

7. The method of claim 1, wherein in the attribute description network, different description values of a same layer are arranged in sequence according to a predetermined sorting criterion.

8. The method of claim 1, wherein the establishing the mapping relationship between the filtering requirements and the attribute description network to generate the path dependency graph according to the mapping relationship includes:

converting each filtering requirement into a description path expression form;

respectively generating at least one description path of each description path expression;

acquiring non-duplicative description paths of the filtering requirements to form a description path set; and mapping description paths in the description path set to the attribute description network to form the path dependency graph.

9. The method of claim 8, wherein the description path includes at least one description value.

10. The method of claim 8, wherein the description path includes a plurality of description values that that have conjunction relationships, different description values of a respective description path being located at different layers in the attribute description network, different description values being arranged in descending order of levels of the different layers at which the description values are located.

11. The method of claim 8, wherein the establishing the mapping relationship between the filtering requirements and the attribute description network to generate the path dependency graph according to the mapping relationship includes:

sorting the description paths based on a sorting rule that a layer at a higher level has a higher priority and a description value appearing first in a same layer has a higher priority;

mapping the description paths to the attribute description network in sequence according to a result of the sorting; and combining parts that have completely identical high-layer description values in the description paths to generate the path dependency graph.

12. The method of claim 11, wherein the high-layer description values in the path dependency graph are completely identical includes all layers having identical description values starting downward from the highest-layer description values included in the description paths.

13. The method of claim 1, further comprising:

during a process of performing the traversal comparison, recording the description path as a matching path of the data object in response to determining that all description values of one description path are included in the description information of the data object; and determining, according to the matching path of the data object, a filtering requirement that the data object meets, the determining includes:

determining, according to a description path expression form of a respective filtering requirement, a description path included in the respective filtering requirement; and determining that the data object meets the filtering requirement, in response to determining that the description path included in the respective filtering requirement is included in the matching path of the data object.

14. The method of claim 13, wherein the determining, according to the matching path of the data object, the filtering requirement that the data object meets further includes:

determining all filtering requirements that the data object meets.

15. The method of claim 14, further comprising classifying the data object into different categories according to the filtering requirements that the data object meets.

16. An apparatus comprising:

a filtering requirement reading unit that reads filtering requirements;

an attribute description network establishment unit that lists description values of the filtering requirements to establish an attribute description network, the attribute description network being a layered network, a respective layer corresponding to a respective attribute field, the respective attribute field having at least one description value, layers of the attribute description network having a hierarchical relationship from high to low level, the attribute description network establishment unit including a description information acquiring sub-unit that acquires description information included in each filtering requirement, performs syntax analysis of the acquired description information to check whether the acquired description information is valid, transforms all or-operations included in the acquired description information into one or more logical conjunction operations;

a data-object-to-be-filtered reading unit that reads description information of a data object and extracts, from the description information of the data object, description values including at least one description value that is in the attribute description network;

a path dependency graph generating unit that reduces data computational amount by establishing a mapping relationship between the filtering requirements and the attribute description network, and generating a path dependency graph according to the mapping relationship; and a traversal comparison unit that performs a traversal comparison including a depth-first traversal between the description values of the data object and description values in the path dependency graph, during a process of performing the traversal comparison, records a description path as a matching path of the data object in response to determining that description values of the description path are included in the description information of the data object, and when the description information of the data object to be filtered does not include a description value, skipping traversal of description paths in the path dependency graph that pass downward through the description value.

17. The apparatus of claim 16, further comprising:
a filtering requirement determining unit that determines, according to the matching path of the data object, a filtering requirement that the data object meets.

18. One or more memories stored thereon computer-executable instructions, executable by one or more processors, to cause the one or more processors to perform acts comprising:
reading filtering requirements;
acquiring description information included in each filtering requirement;
performing syntax analysis of the acquired description information to check whether the acquired description information is valid;
transforming all or-operations included in the acquired description information into one or more logical conjunction operations;
listing description values of the filtering requirements to establish an attribute description network,
the attribute description network being a layered network, a respective layer corresponding to a respective attribute field,
the respective attribute field having at least one description value,
layers of the attribute description network having a hierarchical relationship from high to low level;
reading description information of a data object to be filtered;
extracting, from the description information of the data object, description values including at least one description value that is in the attribute description network;
establishing a mapping relationship between the filtering requirements and the attribute description network to generate a path dependency graph according to the mapping relationship;
performing a traversal comparison between the description values of the data object and description values in the path dependency graph, the traversal comparison including a depth-first traversal; and
when the description information of the data object to be filtered does not include a description value, skipping traversal of description paths in the path dependency graph that pass downward through the description value.

19. The one or more memories of claim 18, wherein the acts further comprise:
during a process of performing the traversal comparison, recording a description path as a matching path of the data object in response to determining that description values of the description path are included in the description information of the data object; and
determining, according to the matching path of the data object, a filtering requirement that the data object meets.

20. The one or more memories of claim 18, wherein the listing description values of the filtering requirements to establish the attribute description network includes:
classifying the acquired description information according to attributes, a corresponding attribute field being set for each attribute, at least one piece of acquired description information belonging to each attribute being normalized and respectively used as at least one description value under a respective attribute field corresponding to a respective attribute; and
hierarchically arranging attribute fields according to the hierarchical relationship to form the attribute description network, a respective layer corresponding to the respective attribute field.

\* \* \* \* \*